US011978138B2

(12) United States Patent
Mashiko

(10) Patent No.: US 11,978,138 B2
(45) Date of Patent: May 7, 2024

(54) INFORMATION PROCESSING APPARATUS, INFORMATION PROCESSING METHOD, AND STORAGE MEDIUM FOR ESTIMATING THE SIZE OF A DETECTION TARGET

(71) Applicant: CANON KABUSHIKI KAISHA, Tokyo (JP)

(72) Inventor: Wataru Mashiko, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 17/824,428

(22) Filed: May 25, 2022

(65) Prior Publication Data

US 2022/0383568 A1    Dec. 1, 2022

(30) Foreign Application Priority Data

Jun. 1, 2021    (JP) .................................. 2021-092513

(51) Int. Cl.
*G06T 11/20*  (2006.01)
*G06T 7/62*  (2017.01)
*G06T 7/73*  (2017.01)
*G06T 11/40*  (2006.01)

(52) U.S. Cl.
CPC .............. *G06T 11/203* (2013.01); *G06T 7/62* (2017.01); *G06T 7/73* (2017.01); *G06T 11/40* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 10,762,588 B2* | 9/2020 | Wani ................ | G06Q 10/06375 |
| 2014/0072170 A1* | 3/2014 | Zhang ................... | G06V 20/53 |
| | | | 382/103 |
| 2015/0332653 A1* | 11/2015 | Kakinuma ............. | H04N 1/465 |
| | | | 345/600 |
| 2017/0147892 A1* | 5/2017 | Ishii ........................ | G06T 7/337 |
| 2018/0061161 A1* | 3/2018 | Nagao ................... | G06Q 10/04 |
| 2019/0220673 A1* | 7/2019 | Ikeda ...................... | G06V 20/53 |
| 2023/0237676 A1* | 7/2023 | Shinkawa ................ | G06T 7/60 |
| | | | 382/103 |

FOREIGN PATENT DOCUMENTS

JP            6261815 B1    1/2018

* cited by examiner

*Primary Examiner* — Jeffrey J Chow
(74) *Attorney, Agent, or Firm* — Carter, DeLuca & Farrell LLP

(57) ABSTRACT

There is provided with an information processing apparatus. A display control unit displays, on an image, a polygon having vertices at respective positions of candidates for at least three detection targets in the image. A determining unit determines, as the at least three detection targets, the candidates for the at least three detection targets, based on user input. A calculating unit calculates a parameter for estimating a size of a detection target that corresponds to a respective position in the image, based on positions and sizes of the determined at least three detection targets.

18 Claims, 8 Drawing Sheets

FIG. 7
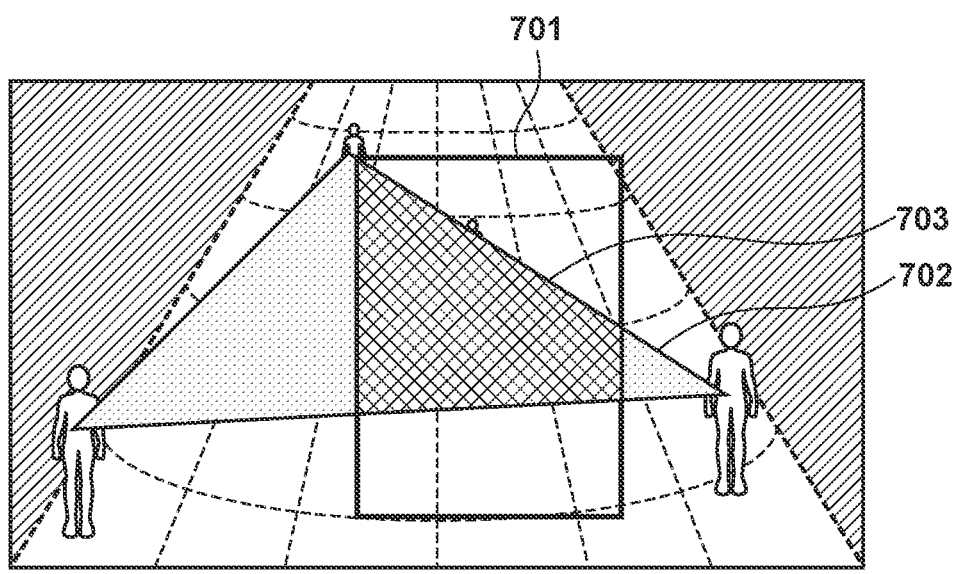
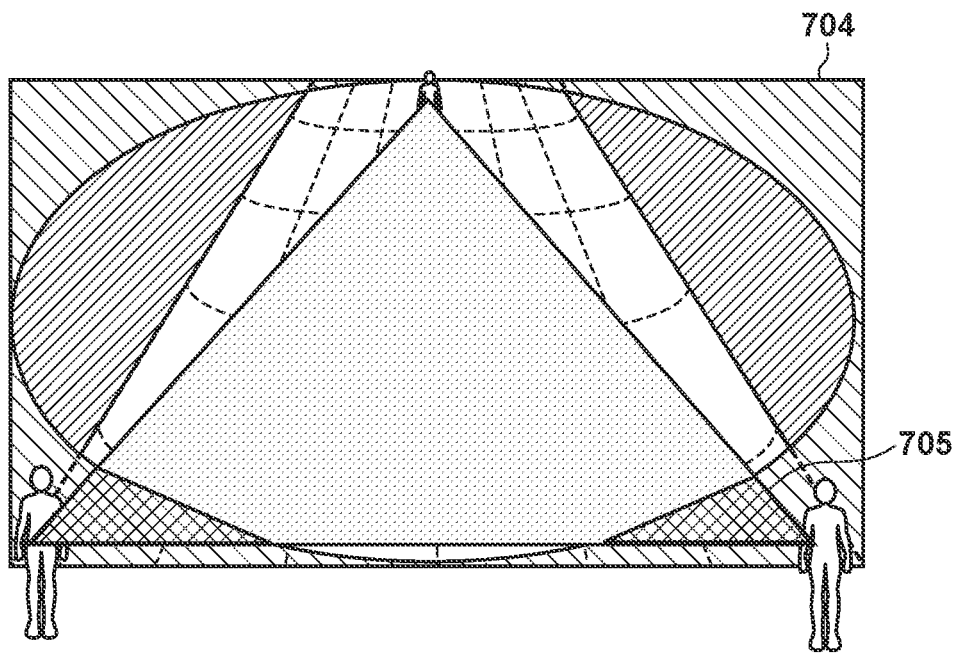

FIG. 9
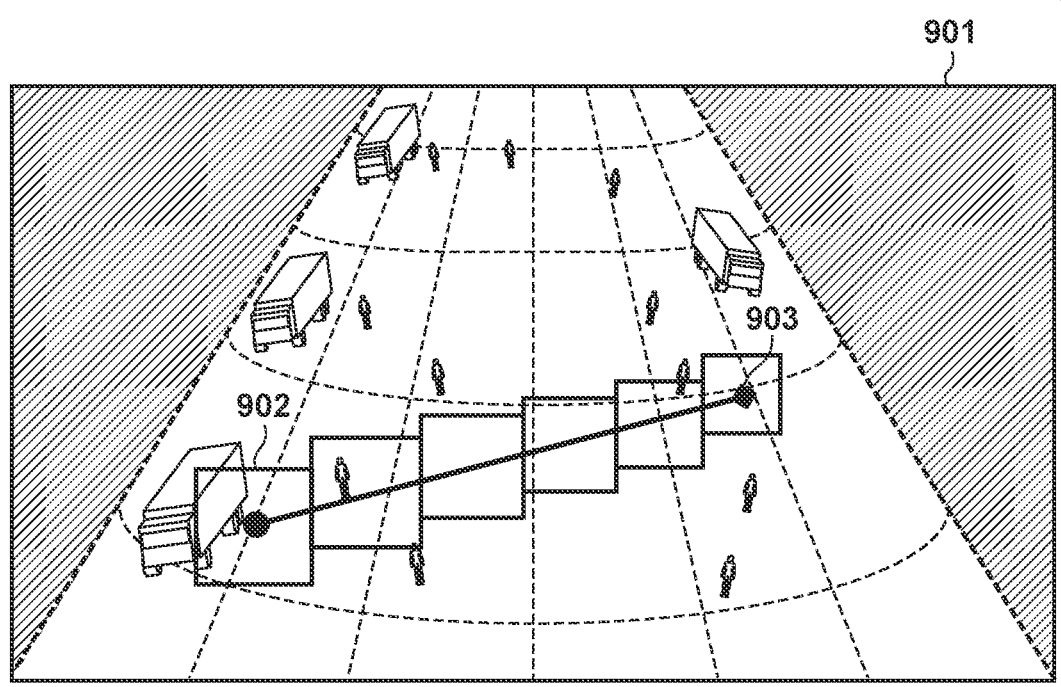
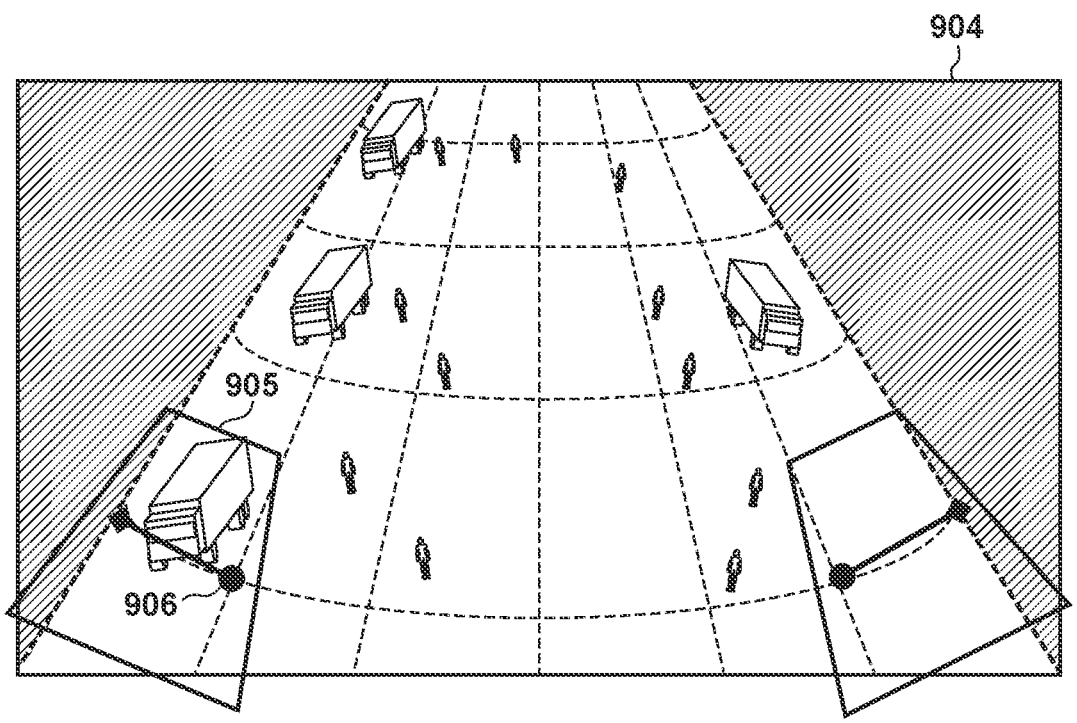

INFORMATION PROCESSING APPARATUS, INFORMATION PROCESSING METHOD, AND STORAGE MEDIUM FOR ESTIMATING THE SIZE OF A DETECTION TARGET

BACKGROUND OF THE INVENTION

Field of the Invention

The present invention relates to an information processing apparatus, an information processing method, and a program.

Description of the Related Art

Generally, many image processing apparatuses that perform detection processing have detection target size requirements. Japanese Patent No. 6261815 discloses a technique for setting, based on a result of processing for analyzing an image, approximately what size a pixel of that image corresponds to in the real world.

SUMMARY OF THE INVENTION

According to one embodiment of the present invention, an information processing apparatus comprises: a display control unit configured to display, on an image, a polygon having vertices at respective positions of candidates for at least three detection targets in the image; a determining unit configured to determine, as the at least three detection targets, the candidates for the at least three detection targets, based on user input; and a calculating unit configured to calculate a parameter for estimating a size of a detection target that corresponds to a respective position in the image, based on positions and sizes of the determined at least three detection targets.

According to one embodiment of the present invention, an information processing method comprises: displaying, on an image, a polygon having vertices at respective positions of candidates for at least three detection targets in the image; determining, as the at least three detection targets, the candidates for the at least three detection targets, based on user input; and calculating a parameter for estimating a size of a detection target that corresponds to a respective position in the image, based on positions and sizes of the determined at least three detection targets.

According to still another embodiment of the present invention, a non-transitory computer-readable storage medium stores a program which, when executed by a computer comprising a processor and a memory, causes the computer to: displaying, on an image, a polygon having vertices at respective positions of candidates for at least three detection targets in the image; determining, as the at least three detection targets, the candidates for the at least three detection targets, based on user input; and calculating a parameter for estimating a size of a detection target that corresponds to a respective position in the image, based on positions and sizes of the determined at least three detection targets.

Further features of the present invention will become apparent from the following description of exemplary embodiments (with reference to the attached drawings).

BRIEF DESCRIPTION OF THE DRAWINGS

FIG. 7 is a diagram illustrating the evaluation of suitability, which accords with an overlapping region, by the information processing apparatus according to the first embodiment.

FIG. 9 is a diagram illustrating detection lines and partial regions that are set by the information processing apparatus according to the second embodiment.

DESCRIPTION OF THE EMBODIMENTS

Figure 1:
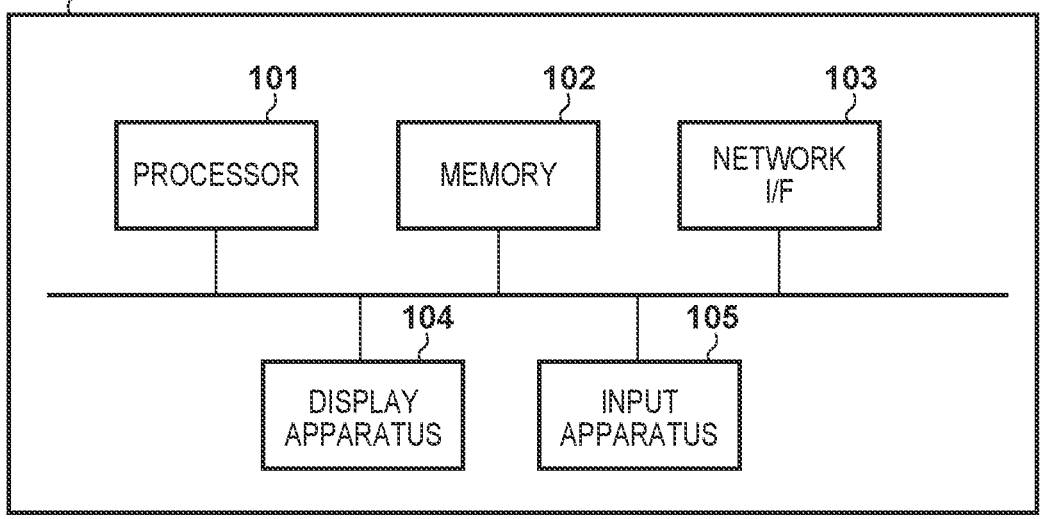
FIG. 1 is a diagram illustrating a hardware configuration of an information processing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

When estimating the size of a detection target that corresponds to its position on an image, there is a technique of estimating their relationship using the positions and sizes of three or more detection targets. However, in cases where the detection targets that are used here are crowded, or the like, there are cases where suitability is too low to estimate the relationship between position and size of detection targets over the entire image. Since the technique described in Japanese Patent No. 6261815 does not indicate which of the detection targets that have been detected by image analysis have been used to calculate parameters, it is difficult for a user to visually and/or intuitively determine whether or not suitability is low.

Embodiments of the present invention set, in an information processing apparatus that calculates parameters for estimating the size of a detection target that corresponds to each position in an image based on the positions and sizes of at least three detection targets, detection targets that are used to calculate parameters in a manner that is visually and intuitively understandable.

First Embodiment

An information processing apparatus according to the present embodiment calculates parameters for estimating the size of a detection target that correspond to each position in an image based on the positions and sizes of at least three detection targets in the image. For this, an information processing apparatus 100 according to the present embodiment acquires user input for specifying three or more detection target candidates in an image and displays a polygon in which each specified detection target candidate is at a vertex. Next, the information processing apparatus 100 acquires user input for confirming the specified detection target candidates as the detection targets to be used to calculate the above-described parameters. Hereinafter, "candidates" simply indicates the at least three detection target candidates that are used for such parameter setting.

Hereinafter, the information processing apparatus 100 according to the present embodiment to be used in a person counting system will be described. Here, assume that the person counting system is a system for detecting detection targets in an image by image analysis and counting the number of detected detection targets. Although description will be given assuming that the detection targets are human bodies, there is no particular limitation so long as they can be detected, such as an animal or a vehicle, for example, and processing for detecting detection targets of a plurality of types may be simultaneously performed. In the person counting system according to the present embodiment, the size of a human body, taking its position (perspective) on an image into account, is used as a parameter in the detection processing. Here, the detection processing may be performed for the entire image or only in a partial region in an image. Hereinafter, description will be given assuming that "analysis" indicates processing for performing the above-described person counting.

FIG. 1 is a block diagram illustrating an example of a hardware configuration of the information processing apparatus 100. The information processing apparatus 100 includes a processor 101, a memory 102, a network interface (I/F) 103, a display apparatus 104, and an input apparatus 105. The processor 101 is, for example, a CPU and performs processing by each functional unit included in the information processing apparatus 100 illustrated in FIG. 2. The memory 102 is, for example, a ROM and a RAM and stores data, programs, and the like that are used by the processor 101. The display apparatus 104 is a liquid crystal display or the like and displays, for example, the result of processing by the processor 101 and presents it to the user. The input apparatus 105 is a mouse and a keyboard, a touch panel, buttons, or the like and acquires user input. The network I/F 103 is an interface for when the information processing apparatus 100 connects to a network. In the present embodiment, the processor 101 realizes the functions of each functional unit of the information processing apparatus 100 by executing processing based on a program stored in the memory 102.

Figure 2:
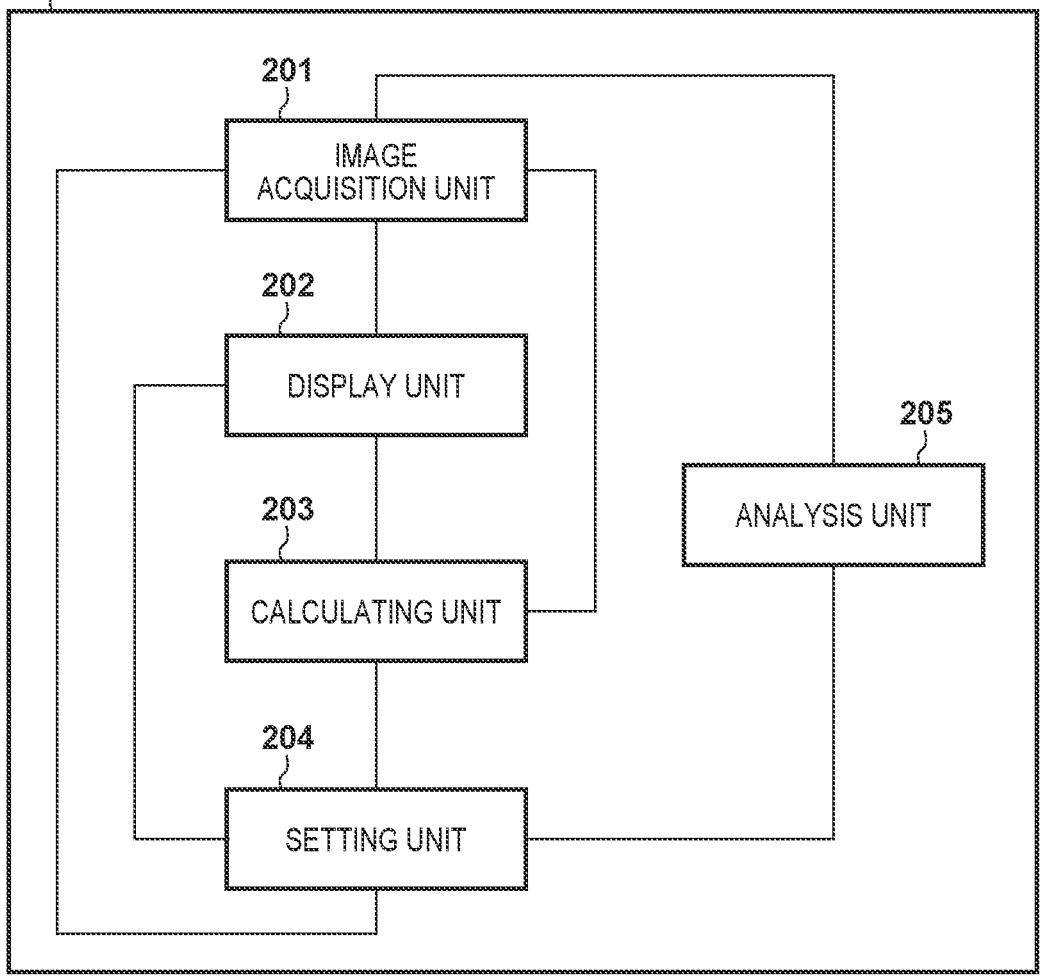
FIG. 2 is a diagram illustrating a functional configuration diagram of the information processing apparatus according to the first embodiment.

FIG. 2 is a block diagram illustrating an example of a functional configuration of the information processing apparatus 100 according to the present embodiment. The information processing apparatus 100 includes an image acquisition unit 201, a display unit 202, a calculating unit 203, a setting unit 204, and an analysis unit 205.

The image acquisition unit 201 acquires one or more images to be processed. The image acquisition unit 201 may acquire an image stored in the memory 102, may acquire an image through the network I/F 103, or may acquire an image using an image capturing unit (not illustrated). The image acquisition unit 201 can acquire a set of images that accords with a specific condition (such as images taken every predetermined period of time by the same camera, for example) by using information on the images such as a date and time of image capturing.

The display unit 202 displays an image acquired by the image acquisition unit 201. Then, the display unit 202 acquires user input for specifying candidates on the acquired image. For example, the display unit 202 can display a preview image for specifying candidates. Although a detailed description will be described later with reference to FIGS. 4 to 7, the display unit 202 may display, superimposed on an image, specifiers that are used for when specifying candidates. In such a case, the display unit 202 may acquire, by click operation via a mouse cursor or by touch operation on a touch panel, user input for operating the specifiers, which specify the detection targets. Here, it is assumed that the detection targets on which the specifiers arranged by user operation are superimposed are the detection targets specified by user input. This processing is not particularly limited so long as user input for specifying candidates is acquired, and for example, the display unit 202 may acquire specification of coordinates in an image as user input. It is assumed that the display unit 202 acquires specification of a predetermined number of candidates, which is three or more (e.g., 3, 4, 5, or more), but configuration may be taken so as to allow the user to specify any number of candidates before performing an operation for confirming the candidates.

The display unit 202 may also acquire user input for specifying candidates over a plurality of images. For example, the display unit 202 may acquire a plurality of temporally continuous images and acquire user input for one or more of them. Therefore, the display unit 202 may be capable of displaying, by switching or at the same time, a plurality of images that are used for specifying candidates. When candidates are specified from a plurality of images, an image on which an auxiliary shape, which will be described later, is displayed may be a representative image of a plurality of images (e.g., an image at the latest time) or an image acquired by combining a plurality of images (e.g., an image displaying a specifier of each candidate at the same time).

The display unit 202 displays, on an image, an auxiliary shape (polygon) having a vertex at the position of each specified candidate. The user can confirm this auxiliary shape and determine whether the specified candidates are appropriate. For example, when three candidates are specified, the display unit 202 can display, superimposed on an image, a triangle having a vertex at a position of each candidate. Here, it is assumed that the position at the center of the specifier is used as the position of each candidate; however, an arbitrary detection position may be used, such as the position of a detected head, for example, or a position acquired from within a range, which has a margin of a predetermined width up and down from a detection position. Further, although each side of the auxiliary shape is generally a straight line, it may be a curve, such as a parabola, for example.

The display unit 202 may generate evaluation information on suitability as candidates in accordance with the position of each specified candidate and then display an auxiliary shape in a manner that corresponds to the generated evaluation information. The display unit 202 according to the present embodiment generates evaluation information on suitability as candidates in accordance with the surface area of an auxiliary shape that has been determined in accordance with the position of each candidate. The display unit 202 may display the auxiliary shape in a darker color as the surface area increases or in different colors depending on whether or not the surface area exceeds a predetermined threshold.

Figure 4:
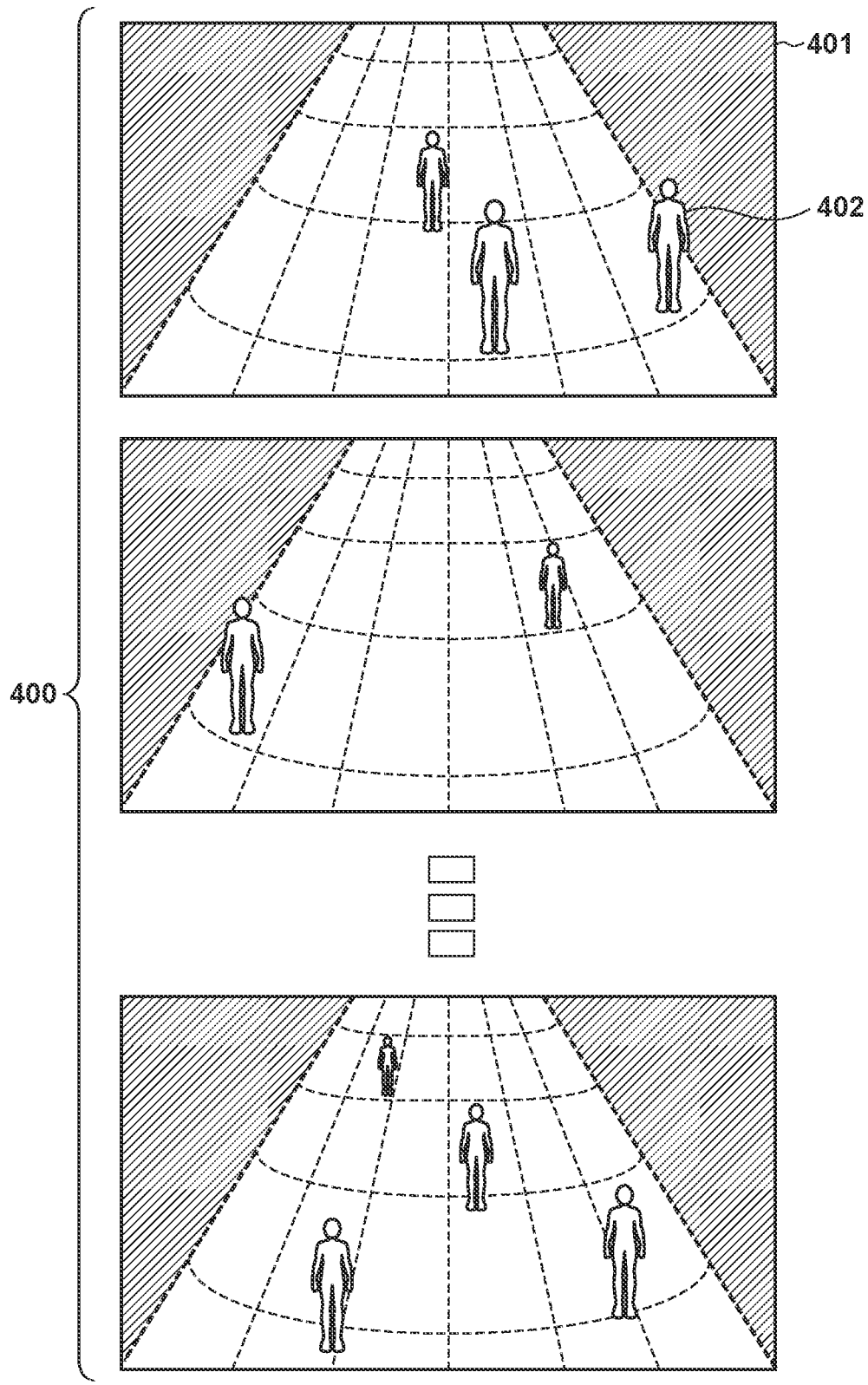
FIG. 4 is a diagram illustrating a group of images that is used by the information processing apparatus according to the first embodiment.
Figure 5:
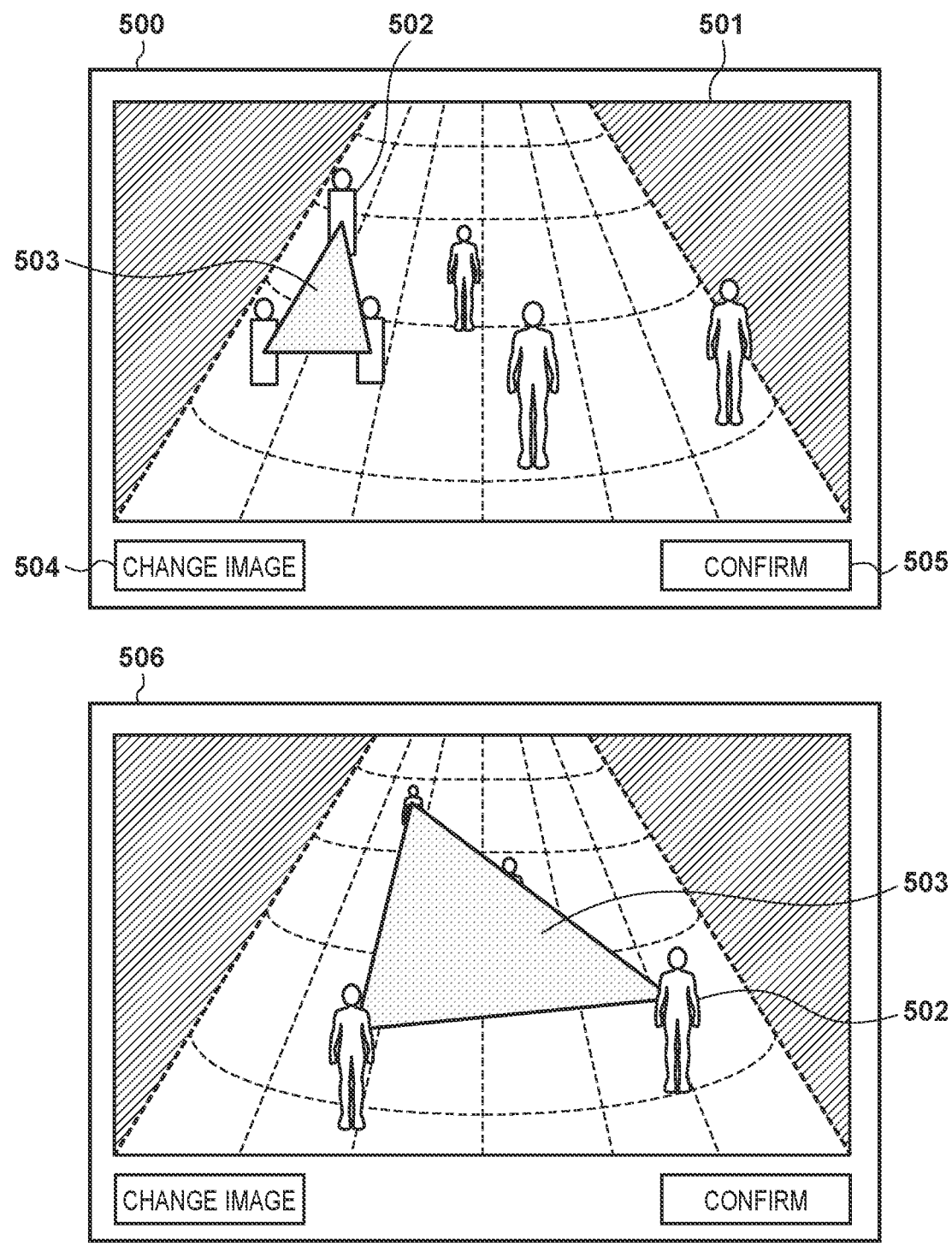
FIG. 5 is a diagram illustrating an auxiliary shape that is displayed by the information processing apparatus according to the first embodiment.
Figure 6:
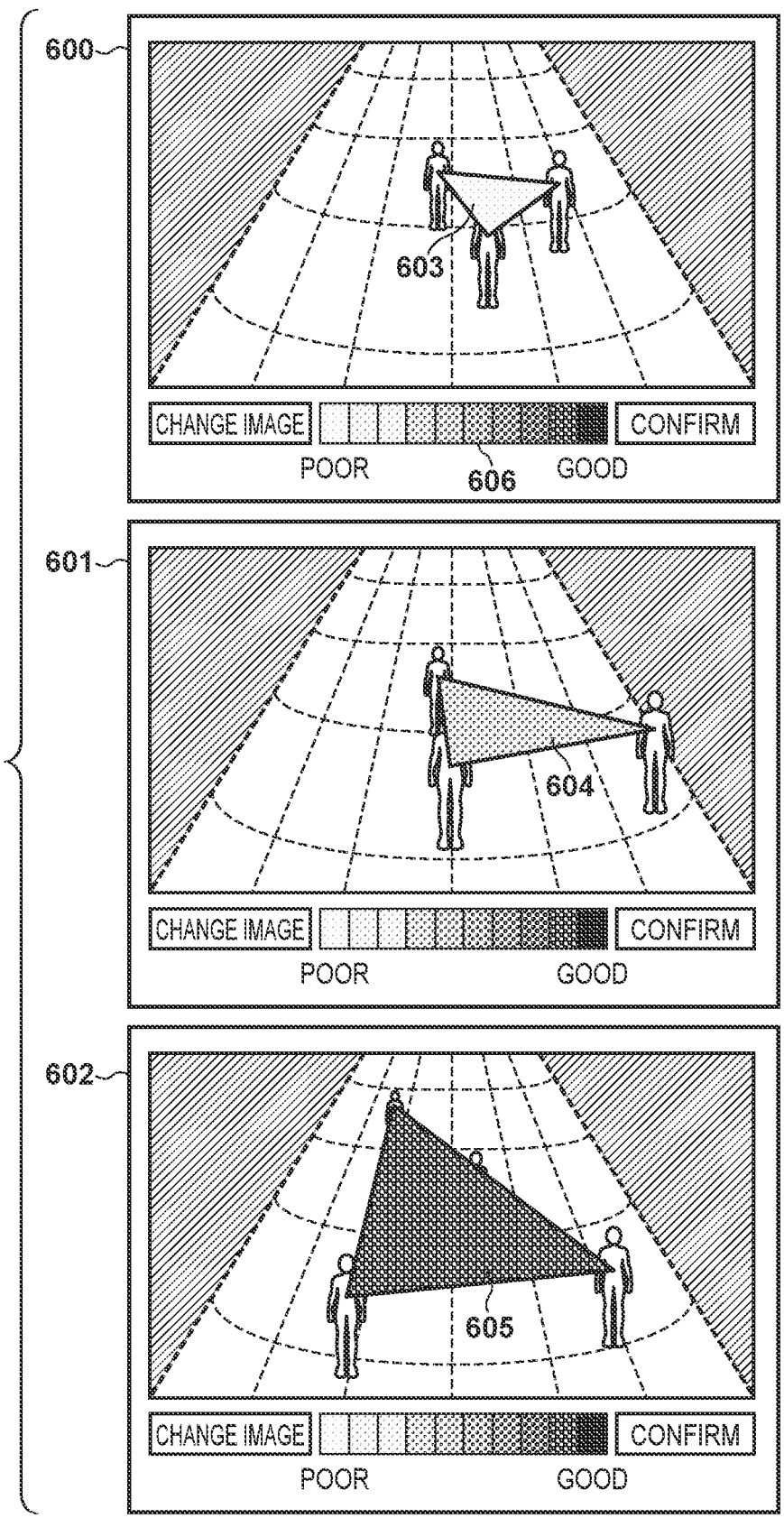
FIG. 6 is a diagram illustrating displays which accord with evaluation of suitability by the information processing apparatus according to the first embodiment.

FIGS. 4 to 6 are diagrams for explaining the displays by the display unit 202 according to the present embodiment. FIG. 4 illustrates examples of preview images displayed by the display unit 202. A group of images 400 is a plurality of images that are presented to a user to specify candidates. A human body 402 is captured in an image 401, and this is detected by detection processing. The group of images 400 may include an image in which a detection target is not captured.

FIG. 5 is a diagram illustrating examples of a GUI displayed by the display unit 202 for prompting the user to specify candidates. In a setting screen 500, the user uses specifiers 502 to specify human bodies as candidates from among the human bodies that are captured in an image 501. Here, it is assumed that, in order to specify candidates, the specifiers are arranged so that their positions and sizes coincide with that of the upper bodies of the human bodies; however, for example, the specifiers may be aligned with the whole body so as to coincide with it in height, or the specifiers may be aligned with the head so as to coincide with it in head width. An auxiliary shape 503 is a polygon having a vertex at each specified candidate, and here, it is a triangle. Further, when a confirmation button 505 on the setting screen 500 is pressed, the candidates that are specified at that time are set as the human bodies that are to be used to calculate parameters for estimating the size of a detection target. The setting screen 500 also displays an image change button 504 for changing the image to be displayed. To specify candidates from a different image, the user can switch the image to be displayed by pressing the image change button 504. It is assumed that, here, the specifiers that have been arranged before changing the image to be displayed are erased, and candidates are newly specified in the newly displayed image. Meanwhile, specifiers that have been arranged on an image may remain even after the image is changed, and the auxiliary shape 503 may be formed based on all the specifiers arranged over a plurality of images.

A setting screen 506 is a screen for when the confirmation button 505 in the setting screen 500 has not been pressed and re-selection of candidates has been performed after the image change button 504 has been pressed. In the setting screen 506, three specifiers 502 that are different from those of the setting screen 500 have been specified, and an auxiliary shape 503 having a larger surface area is displayed. Each time the image change button 504 is pressed to change the image to be displayed, the display may be changed to the next image (e.g., the next temporally-continuous image). Further, when changing the image to be displayed, the display may be changed to the previous image or the next image respectively in response to the pressing of a "previous image" button or a "next image" button displayed on the setting screen 506.

FIG. 6 is a diagram illustrating examples of a GUI for displaying an auxiliary shape that accords with evaluation information on suitability, which is calculated in accordance with the specified candidates. Here, taking into account that an effect that an individual difference has on the difference in size due to the position increases when the specified candidates become crowded, the larger the surface area of the polygon having a vertex at each specified candidate, the higher the suitability is set. In FIG. 6, the auxiliary shapes are displayed by gradation display that corresponds to their surface areas (such that the color becomes darker as the surface area increases). The setting screens 601 to 603 display the auxiliary shapes 603 to 605, respectively, and the display color is darkest in the auxiliary shape 605, less dark in the auxiliary shape 604, and lightest in the auxiliary shape 603 in accordance with their surface area. The display unit 202 may perform display in a manner that is visually understandable by displaying, on the setting screen, a color palette 606 that indicates the relationship between the display color and the degree of suitability. The change of display color may be a change in the color with which the auxiliary shape is filled or may be a change of the color of the frame line, and so long as the corresponding auxiliary shape can be distinguished, this is not particularly limited. When changing the color of the frame line, the display unit 202 may unify the colors of all sides of one auxiliary shape or display each side in a different color. For example, the display unit 202 may display the sides of an auxiliary shape in colors corresponding to their lengths and prompt re-setting of candidates that form a short side. Similarly to the colors that accord with the surface areas of the auxiliary shapes, the colors that accord with the lengths of the sides may be displayed by gradation display that corresponds to their lengths or may be displayed in different colors depending on whether or not a predetermined threshold is exceeded.

Although description here will be made assuming that the evaluation information on suitability is displayed by color, the present invention is not particularly limited to this so long as suitability is displayed such that it can be understood by the user. The display unit 202 may display the evaluation of suitability of the auxiliary shape by, for example, a message or by a blinking display (e.g., the auxiliary shape flashes when the surface area is larger than the threshold). Here, it is assumed that, for example, a first threshold $t_1$ and a second threshold $t_2$ ($t_1 < t_2$) are set, and the evaluation of suitability of the auxiliary shape is high when a surface area S is greater than $t_2$, approximately medium when S is greater than $t_1$ and equal to or less than $t_2$, and low when S is equal to or less than $t_1$. In such a case, the display unit 202 may display corresponding text, which is "excellent", "fair", or "poor", in accordance with the evaluation of suitability and, when $t_2 < S$ which deems that the candidates are suitable, may display "excellent" and, when $S \le t_1$, may determine to prompt the user to re-set the candidates and display "poor". The values of the thresholds used here may be set in advance and may vary depending on the setting, such as a predetermined proportion of the surface area of the region on which analysis processing is to be performed, for example.

The display unit 202 may also display a warning (e.g., at a timing at which the confirmation button 505 is pressed) in accordance with the positions of the specified candidates. For example, when the surface area of the auxiliary shape is smaller than the predetermined threshold, the display unit 202 may display a warning prompting the user to re-set the candidates. In addition, when the positions of the specified candidates are aligned in a straight line, since the range in which the size of a human body can be estimated will be limited by the calculated parameters, the display unit 202 may display a warning prompting the user to re-sett the candidates. Further, when the specified candidates are concentrated in the vicinity of one straight line (aligned so as to be almost a straight line), taking into account that the accuracy of analysis processing in a direction that is perpendicular with respect to that straight line will be reduced, the display unit 202 may display a warning prompting the user to re-sett the candidates. Here, it is assumed that the specified candidates are concentrated in the vicinity of one straight line when the positions of the specified candidates are contained in a partial region having a predetermined width around a certain straight line. Here, it is assumed that the display unit 202 displays a warning prompting the user to re-sett the candidates when the evaluation of suitability is low; however, while the evaluation of suitability is low, a pressing operation may be made impossible by changing the display of the confirmation button.

FIG. 7 is a diagram illustrating an example of an index for displaying the evaluation information on suitability of the specified candidates. In this example, a region 701 on which analysis to be performed in an image is set, and the surface area of the region 701 is $S_1$, the surface area of the auxiliary shape is $S_2$, the surface area of a region in which the region 701 and the auxiliary shape overlap is $S_3$. Here, the display unit 202 may set the evaluation of suitability of the auxiliary shape to, for example, poor when $S_2$ equal to or less than a predetermined proportion of $S_1$ (equal to or less than X %), fair when $S_2$ is greater than X % of $S_1$ and is equal to or less than $S_1$, and good when $S_2$ is greater than $S_1$. Here, X is a value that is greater than 0 and is equal to or less than 100 and set in accordance with desired accuracy. As described above, when performing evaluation, it is possible to set an evaluation method before setting the position of the region 701.

Further, for example, the display unit 202 may set the evaluation of suitability of the auxiliary shape to be excellent when $S_3$ and $S_1$ coincide, to be fair when $0<S_3<S_1$, and to be poor otherwise. As described above, when performing evaluation, it is possible to perform evaluation having considered the setting of the position of the region 701.

Further, in FIG. 7, a region 704 is a region of the inner edge portion of the image, and a region 705 is a region in which the auxiliary shape 702 and the region 704 overlap and whose surface area is $S_4$. When performing image capturing using a wide-angle lens, the inner edge portion of a captured image such as the region 704 is likely to be distorted. Therefore, it is considered that the closer it is to the periphery of the image, the more distorted the relationship of size with respect to the position of the human body will be, and so a human body at such a position is likely to be inappropriate as a candidate. From such a viewpoint, the display unit 202 may calculate evaluation information on suitability of the auxiliary shape in accordance with the degree of overlap of the region 705 over the region 701. It is assumed that, in this example, the display unit 202 sets the evaluation of suitability to excellent when $S_4$ is 0, fair when $S_4$ is greater than 0 and is equal to or less than a threshold ($0<S_4 \leq Y$), and poor when $Y<S_4$. Here, Y is a degree that is used for determining the degree of overlap described above and may be a fixed value or a value set according to the surface area of the region 704 (e.g., in proportion). Here, the region of the inner edge portion may be a region having a predetermined width (e.g., a width of 1/10 of the width of the entire image) from the edge of the image or, as illustrated in FIG. 7, a region of the entire image, excluding a shape such as an ellipse approximately inscribed in the image.

The calculating unit 203 calculates parameters for estimating the size of the human body corresponding to each position in the image based on the positions and sizes of the human bodies that have been confirmed to be used for calculating the parameters. Here, the calculating unit 203 calculates the parameters in a function for calculating the size s of the human body with respect to the position (x, y) of the human body in the image. For example, the calculating unit 203 can calculate parameters a, b, and c with the relationship between the position and size as s=ax+by+c. In such an instance, since there are three unknown parameters, a position $(x_i, y_i)$ and a size $s_i$ of at least three human bodies i are necessary. This calculation processing of parameters can be performed in the same manner as in, for example, the general processing of calculating one or more unknown parameters by which coordinates in an image and the size of a detection target are associated using statistical processing, such as the method of least squares. Further, when the parameters are similarly calculated for a detection target other than a human body, the size of the detection target may be acquired from an image by the detection processing or may be calculated using its ratio to the size of a human body. The ratio of the size of a human body to that of another detection target may be preset in accordance with type, may be configured so that it can be set by the user, or may be automatically estimated during the detection processing.

The setting unit 204 performs setting that is necessary for analysis processing. The setting unit 204 according to the present embodiment performs referencing, editing, and registration of settings used for human body detection, tracking, and human counting processing. Further, a part or all of the processing performed by the display unit 202 and the calculating unit 203 described above may be performed by the setting unit 204. The analysis unit 205 performs analysis processing on the images acquired by the image acquisition unit 201. The analysis processing will be described in detail in a second embodiment.

Figure 3:
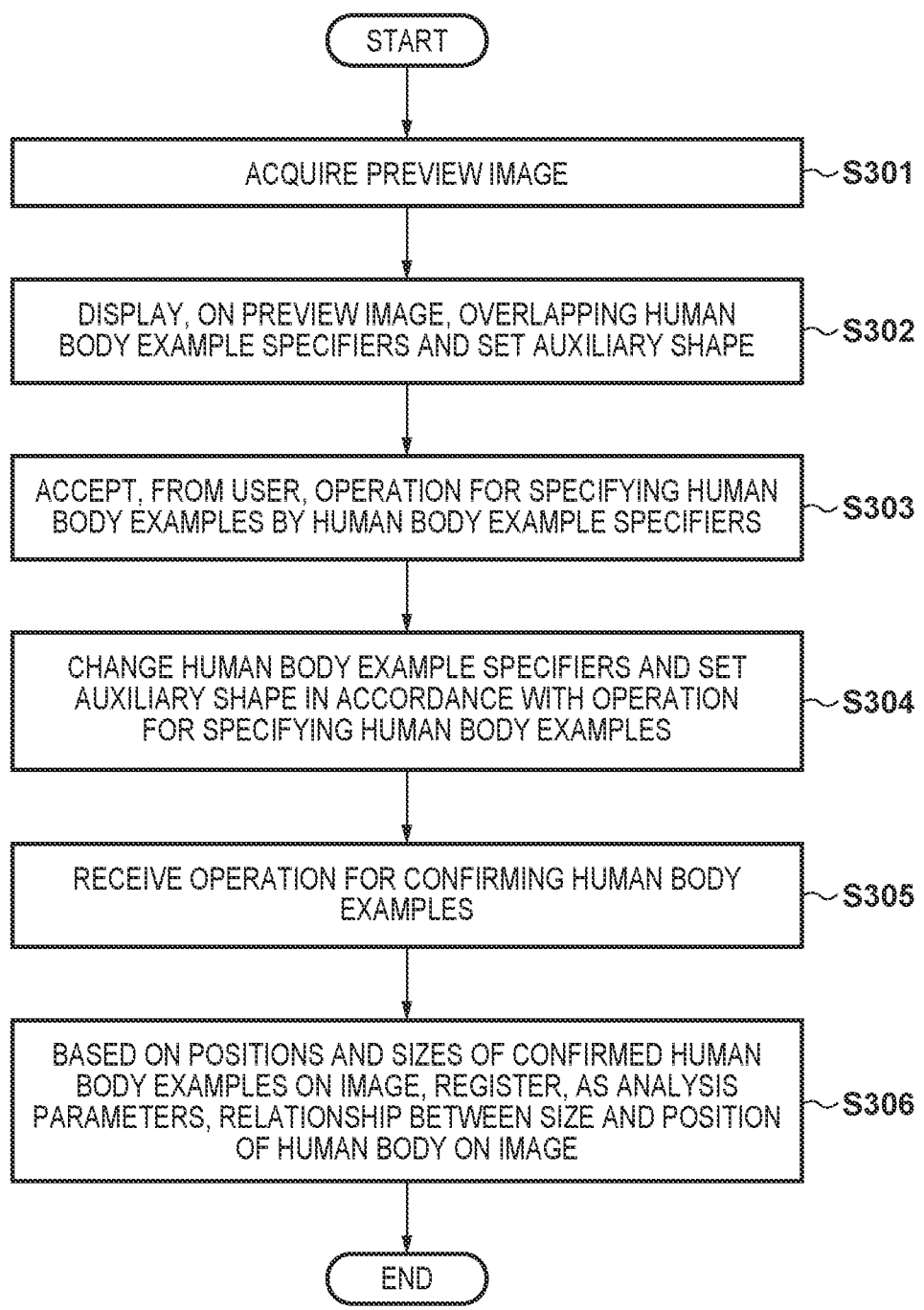
FIG. 3 is a flowchart for describing information processing that is performed by the information processing apparatus according to the first embodiment.

FIG. 3 is a flowchart for explaining an example of processing to be performed by the information processing apparatus 100 according to the present embodiment. In step S301, the image acquisition unit 201 acquires one or more images for previewing. In step S302, the display unit 202 displays one of the images acquired in step S301 and displays, superimposed on the image, the specifiers and the auxiliary shape. Here, it is assumed that, as an initial setting, human bodies of a predetermined number (e.g., three) are selected as candidates, and then the display of the specifiers and the auxiliary shape are performed.

In step S303, the display unit 202 acquires user input specifying candidates. In the next step S304, the display unit 202 displays the specifiers and the auxiliary shape that accords with the acquired specification of candidates. In step S305, the display unit 202 acquires user input that confirms the specified candidates as the human bodies to be used for calculating the parameters. Next, the calculating unit 203 calculates and then registers parameters for estimating the size of a human body corresponding to each position in the image based on the positions and sizes of the human bodies that have been confirmed to be used.

By virtue of such a configuration, it becomes possible to display, in an information processing apparatus that calculates parameters for estimating the size of a detection target that corresponds to each position in an image based on the positions and sizes of at least three detection targets, a polygon having a vertex at each candidate detection target. Next, it becomes possible to acquire user input for confirming the candidates as the detection targets to be used for when calculating the parameters and then calculate the above-described parameters. Accordingly, by presenting the positional relationship between the candidates for detection target to be used at that time in a manner that is visually understandable before calculating the parameters for estimating the size of the detection target for each position, it becomes possible to easily acquire a confirmation instruction from the user when the appropriate candidates are selected.

Second Embodiment

Hereinafter, the information processing apparatus 100 according to the present embodiment that is used in a system for measuring the amount of traffic will be described. Here, it is assumed that the system for measuring the amount of traffic is a system for detecting detection targets in an image by image analysis and counting the number of detection targets that have passed a detection line that has been set in the image. Description will be given assuming that a detection target is a human body or a vehicle; however, it is not particularly limited so long as it is a detectable target, such as an animal, for example. This analysis processing is performed for each detection target that is to be counted. It is assumed that, in order to reduce the analysis load, the analysis processing is to be performed only on the region in the vicinity of the detection line rather than the entire image; however, for example, it may be performed on the entire image or on a partial region of interest in addition to the vicinity of the detection line.

Here, it is assumed that a detection line is used in the system for measuring the amount of traffic described above and is a line segment or a region shaped like a line segment that is provided in an image in order to measure the number of passes of detection targets. As for the detection line and the partial region for analysis that is set in the vicinity of the detection line, those used in a general system for measuring the amount of traffic can be arbitrarily used, and a detailed description on known techniques will be omitted. Here, partial images in the partial region are each extracted from a plurality of images included in a moving image, the analysis processing is performed on the extracted partial images, and the flow of the detection targets is measured. Hereinafter, it is assumed that the partial region includes the partial images corresponding to the partial region as described above.

The information processing apparatus 100 according to the present embodiment has the same configuration as the hardware configuration illustrated in FIG. 1 and the functional configuration illustrated in FIG. 2 of the first embodiment and can perform processing in a similar manner, so redundant descriptions will be omitted.

The analysis unit 205 according to the present embodiment measures the flow of detection targets based on a moving image. For this, the display unit 202 sets, on an image, a detection line that indicates the position for measuring the flow of detection targets. The analysis unit 205 can measure the amount of flow of detection targets that have moved (i.e., the number of detection targets that have passed through) from, for example, one region partitioned by the detection line to another region by crossing the detection line.

Various methods can be utilized to measure flow. For example, a method for detecting and tracking a person to be detected, a method for directly acquiring the amount of flow by estimating the position, the moving direction, the moving speed, and the like of a person to be detected, and the like can be given. Algorithms for realizing such measurement methods include, for example, a matching method, a method using an optical flow, a method using machine learning, and a method using a neural network. It is also possible to use a combination of a plurality of these methods.

To measure flow, a partial image may be used alone, or a plurality of partial images may be used at the same time. When using a plurality of partial images, simultaneous partial images may be used, or partial images of different times may be used.

As a method of specific processing by the analysis unit 205, the following method can be given, for example. First, by inputting each partial image at time $t_1$ to the neural network, the analysis unit 205 estimates the positions of detection targets around the detection line at time $t_1$. Similarly, by inputting each partial image at time $t_2$ to the neural network, the analysis unit 205 estimates the positions of measurement targets around the detection line at time $t_2$. This neural network can be trained so as to estimate the positions of measurement targets (e.g., a person's head) in an image from the image. Further, as another method for improving estimation accuracy, a neural network that has been trained to estimate the density distribution of measurement targets in an image from the image and a neural network that has been trained to estimate the positions of measurement targets from density distribution may be used in combination. By such a method, the analysis unit 205 can estimate, independently for each different region, the positions of measurement targets in each region using a partial image extracted from that region.

Next, by matching the estimated positions of measurement targets at time $t_1$ and the estimated positions of measurement targets at time $t_2$, the analysis unit 205 estimates the paths of measurement targets in a period from time $t_1$ to time $t_2$. It is possible to use, as the matching technique, a method of minimizing the cost that corresponds to the distance between the measurement targets to be matched; for example, it is possible to use a Hungarian matching method. When a path thus estimated intersects the detection line, it can be determined that one measurement target has passed through the detection line. Such matching processing and estimation of paths may be performed at the same time based on the positions of measurement targets that have been detected from the respective partial images.

However, the method of measuring flow is not limited to the above method. The analysis unit 205 may, independently for each different region, estimate the paths of measurement targets in each region using a partial image extracted from that region or measure the flow of measurement targets. For example, the analysis unit 205 need not only estimates the positions of measurement targets for each partial image but may also estimate the paths of measurement targets for each partial image. Further, the flow of measurement targets may be estimated by estimating the positions, the moving directions, the moving speeds, and the like of measurement targets by inputting, to a neural network, the partial images of the same position at time $t_1$ and time $t_2$.

In addition to the same processing as in the first embodiment, the display unit 202 according to the present embodiment is capable of displaying an acquired image as a preview image for setting the detection line. The display unit 202 may display, superimposed on an image, a detection line specifier to be used when specifying a detection line. In such a case, the display unit 202 may acquire, by click operation via a mouse cursor or by touch operation on a touch panel, user input for operating the specifier for setting a detection line. Here, it is assumed that the start point and the end point of a detection line are arranged by user operation, and a line segment from the start point to the end point is set as a detection line inputted by the user. This processing is not particularly limited so long as user input for setting a detection line is acquired, and for example, the display unit 202 may acquire specification of coordinates of the start point and the end point of a detection line as user input. In addition, the setting unit 204 may acquire the specification of two points without distinguishing the start point and the end point and then acquire the direction of the detection line or may acquire the start point, direction, and length as input. It is assumed that the display unit 202 acquires setting of detection lines of a predetermined number that is equal to or greater than 1 (e.g., 1, 2, or more), and the number can be arbitrarily determined. Although description will be given assuming that the detection line is basically a straight line, it may be, for example, any bent line, a curved line, or the like.

The display unit 202 according to the present embodiment sets partial regions (patches) for analysis in the vicinity of the detection line. The display unit 202 sets a plurality of patches so as to include the entire detection line. Here, the display unit 202 sets the sizes of the patches using the size of a detection target estimated with respect to the position of the patch using the parameters calculated by the calculating unit 203 in the same manner as in the first embodiment. For example, the display unit 202 can set the sizes of the patches each having its center on the detection line, based on the size of the detection target estimated from the position of that center. Here, it is assumed that a patch is a square region whose length of a side is 6.5 times the size of the detection target (e.g., the shoulder width of the human body) corresponding to the position of the center of that patch; however, its size and shape are not particularly limited and may be, for example, a rectangle, a trapezoid, a circle, or the like. The information processing apparatus 100 can measure the number of detection targets by performing analysis processing for a region in this patch.

Further, when the patch is a trapezoid, the display unit 202 can set the respective lengths of the top side and the bottom side of the patch from the size of the detection target corresponding to the position of the center (e.g., the center of mass) of the patch. For example, the display unit 202 may set the length of the top side of the patch to be 4 times the size of the detection target at the center-of-mass position and the length of the bottom side of the patch to be 6.5 times the size of the detection target at the center-of-mass position. By making the patch a trapezoid, it is possible to perform analysis processing in the patch in which the change in size of the captured detection target due to perspective is considered. It is assumed that the trapezoidal patch is set such that a depth direction of perspective in an image is in a direction that is perpendicular to the top side and the bottom side of the trapezoid; however, it may be adjusted in accordance with desired conditions.

In order to suppress omission from measurement in the vicinity of the ends of the detection line, the display unit 202 may set, in the vicinity of the detection line, in addition to the patch described above, a partial region (a detection patch) in which the number of detection targets are not measured but detection and tracking processing is performed. Here, a detection patch is set for each patch and is a partial region that fully encompasses the corresponding patch. The shape, size, and position of the detection patch are not limited so long as the detection patch fully encompasses the corresponding patch. Here, it is assumed that the detection patch has the same shape as the corresponding patch and is a region which is a partial region of a size that has a predetermined ratio to that of the corresponding patch (corresponding patch size<the size of the detection patch) and is set in alignment with the center coordinates of the corresponding patch but excludes the corresponding patch.

In the following, description will be given assuming that a patch is a square region whose length on one side is 6.5 times the shoulder width of a human body, while the detection patch is a square region whose length of one side is 8 times the shoulder width of the human body excluding the patch. By generating such a detection patch to start the detection and tracking processing in the detection patch, which is a region on the outer edge portion of a patch, before measuring the number of detection targets in the analysis processing in the patch, it becomes possible to suppress omission of detection targets from the measurement.

Figure 8:
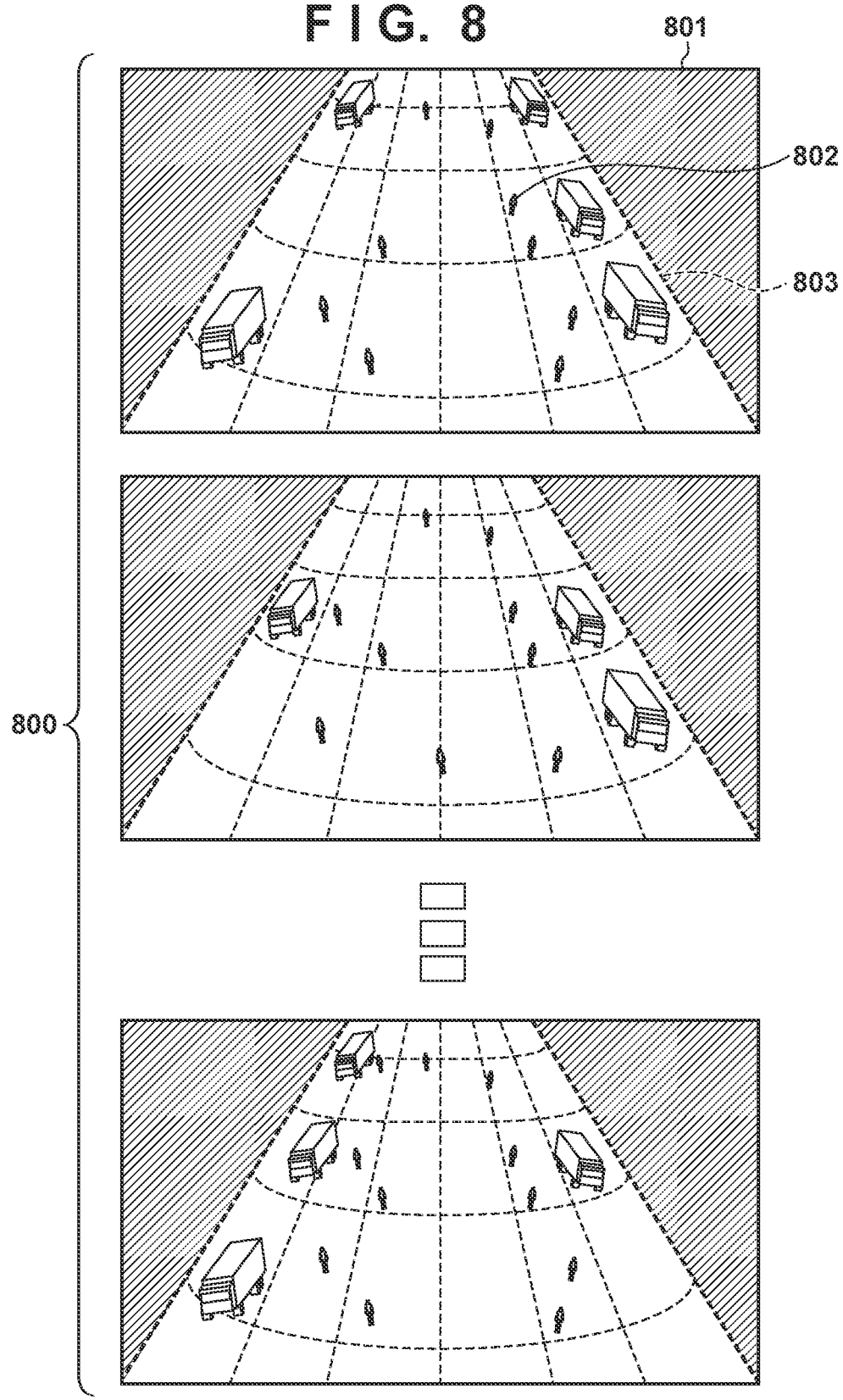
FIG. 8 is a diagram illustrating a group of images that is used by the information processing apparatus according to a second embodiment.

FIG. 8 illustrates examples of preview images displayed by the display unit 202 according to the present embodiment. A group of images 800 is a set of two or more images 801. An image 801 includes a human body 802 to be detected and a vehicle 803, and these are detected by the detection processing in the system for measuring the amount of traffic. The group of images 800 may include an image in which a detection target is not captured.

FIG. 9 is a diagram for explaining an example of processing of setting patches with respect to a detection line performed by the information processing apparatus 100 according to the present embodiment. In an image 901, a detection line 903 is displayed, and a plurality of patches 902 are set in the vicinity of the detection line 903 so as to include the entire detection line 903 therein. Here, each patch is a square region whose center is on the detection line 903 and each of whose size is set as described above based on the position of its center.

In an image 904, two patches 905 are each set in the vicinity of a detection line 906, of which there are two, so as to include the entire detection line 906 therein. Here, each patch is a trapezoidal region whose center of mass is present on the detection line, and the length of the top side and the length of bottom side are set based on the coordinates of its center of mass. Further, the length of the top side and the length of the bottom side of the trapezoid and may be set to be equal.

By virtue of such a configuration, it becomes possible to calculate parameters for estimating the size of the detection target corresponding to each position in an image based on the positions and sizes of detection targets confirmed by the user as at least three detection targets by the same processing as in the first embodiment. Next, detection line for measuring the flow of detection targets is set, and in the vicinity of the detection line, a plurality of partial regions having sizes based on the size of the detection target that is estimated using the parameters calculated from the positions of respective partial regions are set. Furthermore, it is possible to measure the flow of detection targets that pass through the detection line by using partial images extracted in the partial region from a moving image. Accordingly, it becomes possible to visually and intuitively set detection targets to be used for calculating the parameters and measure the flow of detection targets based on that setting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-092513, filed Jun. 1, 2021, which is hereby incorporated by reference herein in its entirety.

What is claimed is:

1. An information processing apparatus comprising:
   at least one processor; and
   a memory including instructions stored thereon which, when executed by the at least one processor, cause the apparatus to:
   identify respective positions of at least three objects;
   display, on an image, a polygon having vertices at the respective positions of the at least three objects;
   change at least one of the objects in response to a user operation received after displaying the polygon having the vertices at the respective positions of the at least three objects; and
   determine, based on positions and sizes of at least three objects, at least one of which is changed in response to the user operation, a parameter regarding a size of a detection target to be detected from an image.

2. The information processing apparatus according to claim 1, wherein the instructions, when executed by the at least one processor, further cause the apparatus to:
   display, on the image, one or more specifiers to be used by a user to designate the objects; and
   acquire, via the displayed specifiers, user input for identifying the at least three objects.

3. The information processing apparatus according to claim 2, wherein the instructions, when executed by the at least one processor, further cause the apparatus to:
   acquire evaluation information that indicates an evaluation of suitability of at least three detection targets identified, wherein
   display the evaluation information on the image.

4. The information processing apparatus according to claim 3, wherein the instructions, when executed by the at least one processor, further cause the apparatus to:
   acquire the evaluation information based on a size of the polygon having vertices at the respective positions of the at least three objects.

5. The information processing apparatus according to claim 4, wherein the instructions, when executed by the at least one processor, further cause the apparatus to:
   acquire a higher evaluation when the size of the polygon is a first size in comparison with a case where the size of the polygon is a second size smaller than the first size.

6. The information processing apparatus according to claim 3, wherein the instructions, when executed by the at least one processor, further cause the apparatus to:
   set a first partial region on the image for tracking the detection targets, wherein
   acquire the evaluation information based on a size of the first partial region and the size of the polygon.

7. The information processing apparatus according to claim 6, wherein the instructions, when executed by the at least one processor, further cause the apparatus to:
   acquire the evaluation information based on a ratio of the size of the first partial region to the size of the polygon.

8. The information processing apparatus according to claim 7, wherein the instructions, when executed by the at least one processor, further cause the apparatus to:
   acquire:
   a first evaluation in a case where the size of the polygon is equal to or less than a predetermined proportion of the size of the first partial region,
   a second evaluation that is higher than the first evaluation in a case where the size of the polygon is greater than the predetermined proportion of the size of the first partial region and is equal to or less than the size of the first partial region, and
   a third evaluation that is higher than the second evaluation in a case where the size of the polygon is greater than the size of the first partial region.

9. The information processing apparatus according to claim 6, wherein the instructions, when executed by the at least one processor, further cause the apparatus to:
   acquire the evaluation information based on a size of a region in which the first partial region and the polygon overlap.

10. The information processing apparatus according to claim 9, wherein the instructions, when executed by the at least one processor, further cause the apparatus to:
    acquire:
    a first evaluation in a case where there is no region in which the first partial region and the polygon overlap,
    a second evaluation that is higher than the first evaluation in a case where the size of the region in which the first partial region and the polygon overlap is smaller than the size of the first partial region, and
    a third evaluation that is higher than the second evaluation in a case where the size of the region in which the first partial region and the polygon overlap is the same as the size of the first partial region.

11. The information processing apparatus according to claim 3, wherein the instructions, when executed by the at least one processor, further cause the apparatus to:
    set a second partial region in an inner edge portion of the image, wherein
    acquire the evaluation information based on a size of a region in which the second partial region and the polygon overlap.

12. The information processing apparatus according to claim 11, wherein the instructions, when executed by the at least one processor, further cause the apparatus to:
    acquire:

in a case where there is a region in which the second partial region and the polygon overlap, in a case where the size of the region in which the second partial region and the polygon overlap is greater than a threshold that is defined based on a size of the second partial region and the size of the polygon, sets evaluation of the suitability to a first level, in a case where the size of the region in which the second partial region and the polygon overlap is equal to or less than the threshold that is defined based on the size of the second partial region and the size of the polygon, sets the evaluation of the suitability to a second level that is higher than the first level, and in a case where there is no region in which the second partial region and the polygon overlap, sets the evaluation of the suitability to a third level that is higher than the second level.

13. The information processing apparatus according to claim 3, wherein the instructions, when executed by the at least one processor, further cause the apparatus to:

in a case where all of the at least three objects are positioned inside a partial region having a predetermined width in the image, acquire the evaluation lower than in a case where that is not the case.

14. The information processing apparatus according to claim 3, wherein the instructions, when executed by the at least one processor, further cause the apparatus to:

display in a case where evaluation information indicates lower evaluation than a predetermined threshold.

15. The information processing apparatus according to claim 3, wherein the instructions, when executed by the at least one processor, further cause the apparatus to:

determine a color with which the polygon is filled or a color of a frame of the polygon in accordance with the evaluation of the suitability.

16. The information processing apparatus according to claim 1, wherein the instructions, when executed by the at least one processor, further cause the apparatus to:

set, in a moving image, a detection line that indicates a position at which a flow of the detection targets are measured; and extract, from each of a plurality of images in the moving image, a plurality of partial images set in a vicinity of the detection line, wherein sizes of the plurality of partial images are set based on sizes of the detection targets corresponding to positions of the partial images estimated using the parameter; and measure a flow of the detection targets that pass through the detection line using the partial images.

17. An information processing method comprising:

identifying respective positions of at least three objects;

displaying, on an image, a polygon having vertices at the respective positions of the at least three objects;

changing at least one of the objects in response to a user operation received after displaying the polygon having the vertices at the respective positions of the at least three objects; and determining, based on positions and sizes of at least three objects at least one of which is changed in response to the user operation, a parameter regarding a size of a detection target to be detected from an image.

18. A non-transitory computer-readable storage medium storing a program which, when executed by a computer comprising a processor and a memory, causes the computer to:

displaying, on an image, a polygon having vertices at respective positions of candidates for at least three detection targets in the image;

determining, as the at least three detection targets, the candidates for the at least three detection targets, based on user input; and determining, based on positions and sizes of at least three objects at least one of which is changed in response to a user operation, a parameter for estimating a size of a detection target that corresponds to a respective position in the image, based on positions and sizes of the determined at least three detection targets.

* * * * *